United States Patent
Kikuchi et al.

[11] Patent Number: 6,166,677
[45] Date of Patent: Dec. 26, 2000

[54] IMAGE SYNTHESIZING METHOD USING A PLURALITY OF REFLECTION RADAR WAVES AND AIRCRAFT IMAGE RADAR APPARATUS USING THE METHOD

[75] Inventors: Takeshi Kikuchi; Hitoshi Nohmi, both of Tokyo, Japan

[73] Assignee: NEC Corporation, Tokyo, Japan

[21] Appl. No.: 09/363,705

[22] Filed: Jul. 29, 1999

[30] Foreign Application Priority Data

Jul. 31, 1998 [JP] Japan ................................ 10-218102

[51] Int. Cl.[7] ................................................ G01S 13/90
[52] U.S. Cl. ........................ 342/25; 342/29; 342/140; 342/179; 342/192; 342/196; 342/197
[58] Field of Search ..................... 342/25, 29, 33, 342/36, 90, 111, 117, 120, 123, 140, 156, 179, 192, 193, 196, 197

[56] References Cited

U.S. PATENT DOCUMENTS

| | | | |
|---|---|---|---|
| 5,170,170 | 12/1992 | Soumekh | 342/179 |
| 5,394,151 | 2/1995 | Knaell et al. | 342/25 |
| 5,608,404 | 3/1997 | Burns et al. | 342/25 |
| 5,659,318 | 8/1997 | Madsen et al. | 342/25 |
| 5,818,383 | 10/1998 | Stockburger et al. | 342/25 |

FOREIGN PATENT DOCUMENTS

| | | |
|---|---|---|
| 4-120838 | 4/1992 | Japan . |
| 9-17188 | 1/1997 | Japan . |
| 9-205435 | 8/1997 | Japan . |
| 11-275082 | 11/1999 | Japan . |

OTHER PUBLICATIONS

Japanese Office Action issued Apr. 4, 2000 in a related application and English translation of relevant portions.
M. Nishio, et al., "The Nobeyama Radioheliograph—Hardware System—", Proc. of Kofu Symposium, NRO Report No. 360, Jul. 1994, pp. 19–31.

*Primary Examiner*—John B. Sotomayor
*Attorney, Agent, or Firm*—Ostrolenk, Faber, Gerb & Soffen, LLP

[57] ABSTRACT

The present invention provides a small-size image radar apparatus to be mounted on an aircraft, having a high resolution not only the flying direction but also in the direction vertical to the flying direction. The image radar apparatus comprises a transmission antenna 2, a plurality of independent reception antennas $5_1$, $5_2$, and a computer 10 for simultaneously executing a two-dimensional phase synthesis. The synthesis result is obtained as a two-dimensional image.

17 Claims, 10 Drawing Sheets

(A)

(B)

(A)

(B)

IMAGE SYNTHESIZING METHOD USING A PLURALITY OF REFLECTION RADAR WAVES AND AIRCRAFT IMAGE RADAR APPARATUS USING THE METHOD

BACKGROUND OF THE INVENTION

1. Field of the Invention

The present invention relates to an image synthesizing method using a plurality of radar reflection waves and an image radar apparatus for an aircraft using the method and in particular, to a multiple-radar wave image synthesizing method for catching a front information in the aircraft flying direction, and an image radar apparatus using the method for an aircraft.

2. Description of the Related Art

Conventionally, there have been developed various types of aircraft radar apparatuses for various purposes. All of these radar apparatuses have a common target how to improve their resolution levels.

As a method to increase the resolution level in an aircraft radar apparatus, the pulse Doppler method has been used. This pulse Doppler method is characterized in a high resolution in the distance direction.

Moreover, as a high-resolution radar apparatus to be mounted on an aircraft, there has been known an Synthetic Aperture Radar or SAR.

Furthermore, there is known a phased array type radar having a plurality of arrayed antennas as a small size radar apparatus.

In this phased array type radar has an antenna block as an independent small unit so as to change the direction of the antenna rapidly using the signal phase synthesis technique.

Moreover, the aforementioned phased array type radar has been further developed into a conformal antenna in which an aircraft wing member is made together with an antenna. In this radar apparatus, there is no problem of the antenna aperture length. It has been confirmed that the spatial resolution is sufficiently improved.

On the other hand, there has been developed a sun-radio wave heliograph has been developed as a category near to the phased array type radar in which an image is created by radio information phase synthesis. (For example, see Nakazima et al "The Nobeyama Radioheliograph-Hardware System—(PP. 19–31)".

As is clear from the aforementioned document, in the sun radio wave heliograph, radio waves generated by the sun is received a plurality of antennas arranged in T-shaped formation and two-dimensional phase synthesis is simultaneously performed so that the sun image can be displayed with resolution of 10 seconds (degree).

However, each of the conventional radar apparatuses has a problem. Firstly, in the case of the pulse Doppler method, it is possible to obtain a high resolution in the distance direction but the resolution in the direction orthogonal to the distance direction is determined by an antenna beam width and cannot be increased than this.

That is, a pulse wave produced from a transmission antenna is reflected by an object and a reception antenna receives composite reflections from objects at an identical distance. In this case, if a single reception antenna is used, the antenna beam B spread is determined by the antenna configuration and size (aperture length). Accordingly, as shown in FIG. 9, it is impossible to separate a plurality of objects, for example, two targets $K_1$ and $K_2$ at an identical distance.

As for the forward distance direction, there is no case that there are two objects at an identical distance if on the plane land. However, if there is a mountain, as shown in FIG. 10, there may be two objects $K_3$ and $K_4$ at an identical distance and cannot be isolated from each other.

On the other hand, Synthetic Aperture Radar (SAR) which is a high-resolution image radar uses the Doppler effect accompanying the relative movement between the aircraft and an object on the earth. Accordingly, the front and the back of the aircraft cannot be seen because there is no Doppler effect.

Furthermore, in the phased array type radar, reception signals of a plurality of arrayed antennas are synthesized and the arrayed antennas constitute an independent small unit. Accordingly, the aperture length of the entire antenna unit has a small aperture length, which results in a low resolution.

Moreover, in a radar apparatus using a conformal antenna, there is no aperture length problem but it takes much time for a data creation for one screen because beam scan is performed by changing phase synthesis parameters. Accordingly, this type of apparatus is not useful for a successive front monitoring.

As for the successive monitoring the front of an aircraft with a sufficiently high resolution, an antenna having a real large aperture is used such as AWACS produced by Boeing Co., Ltd.

However, the technique to use an antenna having a real large aperture has a problem that the air resistance is large and the weight is also increased, which are disadvantages for an air craft.

The aforementioned sun radio wave heliograph which is a radio information imaging apparatus does not transmit an electric wave and installed at a fixed point, which is a disadvantage for an aircraft.

SUMMARY OF THE INVENTION

It is therefore an object of the present invention to provide an air-craft-intended image radar apparatus having a high resolution in the distance direction forward of the air craft as well as a sufficiently high resolution in the direction orthogonal to the flying direction, and that with a small size and a high reliability.

The image synthesis method according to the present invention uses a plurality of radar waves from at least two reception antennas mounted at a predetermined distance from each other for receiving reflection waves of a radar wave emitted forward from an aircraft, wherein information items obtained from these plurality of antennas are image-synthesized so as to identify a position of a reflection object. The method comprises the following steps.

In a first step, a distance from each of the reception antennas to an object or objects are calculated using one or more than one reflection waves caught by the reception antennas.

In a second step, within an antenna directivity (antenna beam), a reflection object position arc-shaped curve is calculated for each of the reception antennas as the center of the arc curve.

In a third step, the reflection object position curves obtained within the antenna beam from the second step and the first step are plotted on common coordinates based on the reception antenna directions and a distance between the reception antennas.

In a fourth step, actual position of the reflection object (or reflection objects) is (are) identified as intersecting points of the reflection object position curves on the synthesized image obtained by step 3.

BRIEF DESCRIPTION OF THE DRAWINGS

FIG. 5A shows an example of reflection radar wave when two objects cannot be isolated from each other. FIG. 5B shows a relationship between the real position and a (first) reception beam of one (first) of the antennas.

FIG. 6A shows an example of two reflection radar waves when two objects can be isolated from each other. FIG. 6B shows a relationship between the real position and the other (second) reception beam of the other (second) antenna.

DESCRIPTION OF THE PREFERRED EMBODIMENTS

Description will now be directed to a n embodiment of the present invention with reference to FIG. 1 to FIG. 8.

Figure 1:
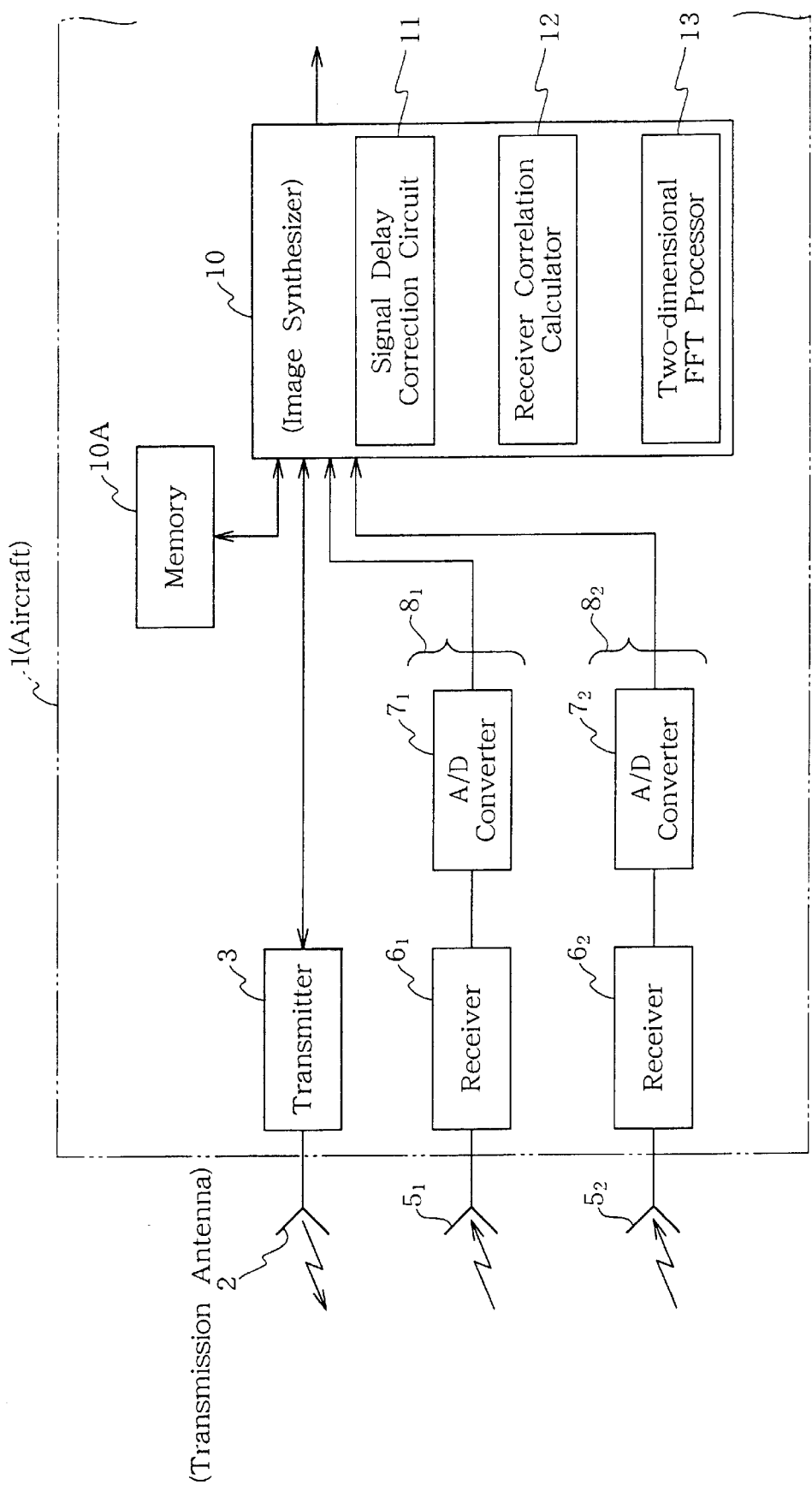
FIG. 1 is a block diagram showing a signal processing system according to a first embodiment of the present invention.
Figure 2:
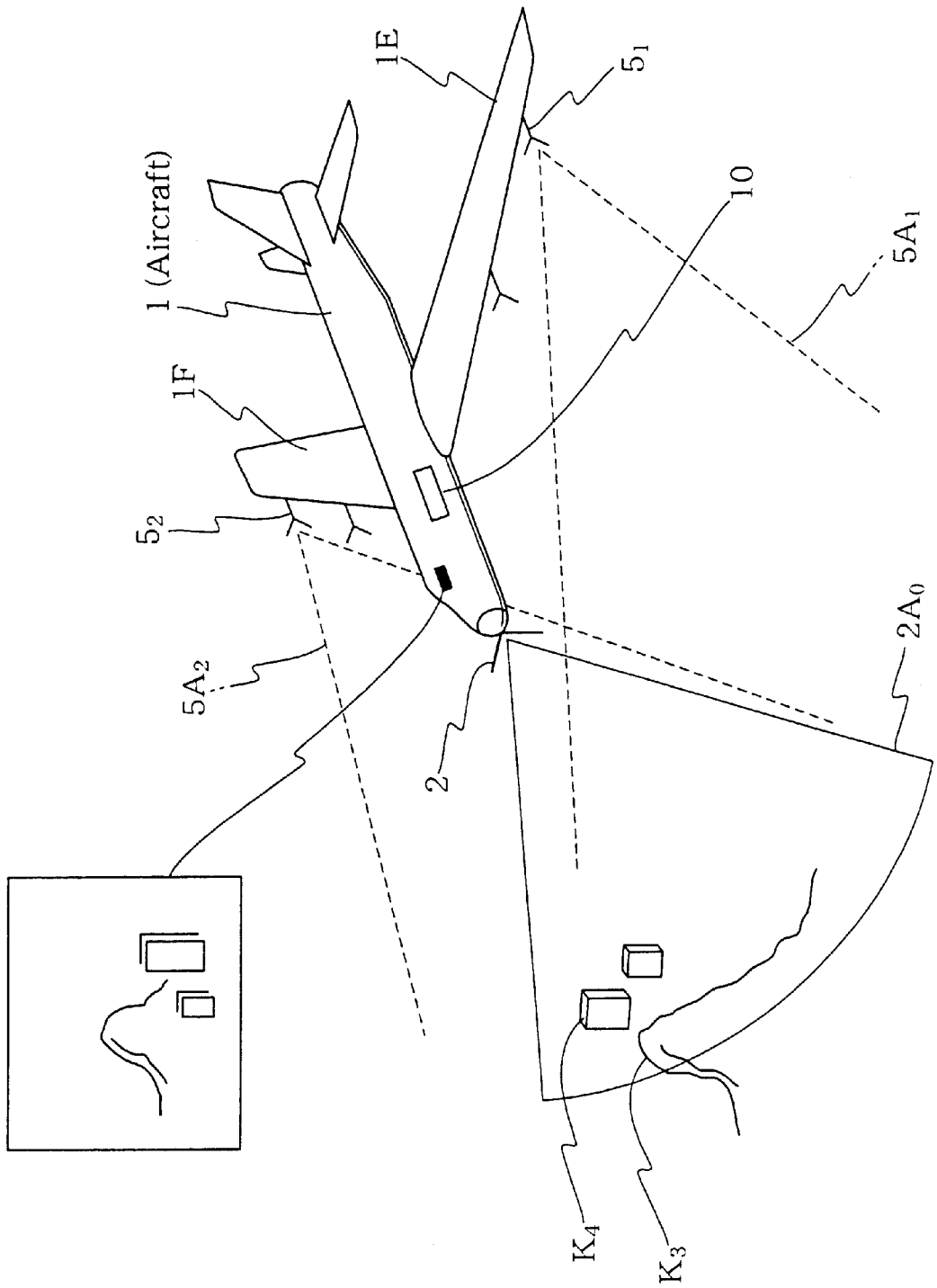
FIG. 2 shows locations of the respective components of FIG. 1 when mounted on an aircraft.

FIG. 1 is a block diagram of a signal processing system of the present embodiment. FIG. 2 shows components of the signal processing system of FIG. 1 actually allocated on an aircraft.

On the head the aircraft 1, a radar transmission antenna 2 is provided for transmitting a predetermined survey electric wave. Adjacent to this transmission antenna 2, there is provided a transmitter 3 for exciting the transmission antenna 2.

Through this transmitter 3 and the transmission antenna 2, a frequency-modulated pulse wave is transmitted as a radar wave to the front direction of the aircraft.

Moreover, in this embodiment, as shown in FIG. 2, two reception antennas $5_1$ and $5_2$ having a predetermined antenna beam directivity are arranged on a left wing 1E and a right wing 1F, respectively. These two antennas $5_1$ and $5_2$ operate independently of each other and receive reflection radar waves from the earth independently of each other.

Here, a reference symbol $2A_0$ denotes a transmission beam of the transmission antenna 2. Moreover, $5A_1$ and $5A_2$ indicate transmission beams of the reception antennas $5_1$ and $5_2$.

Adjacent to these reception antennas $5_1$ and $5_2$, there are provided a receiver $6_1$ and $6_2$, respectively for converting a reflected radar wave into a predetermined electric signal.

Furthermore, an image synthesizer (including a phase synthesize processor) 10 is mounted on the aircraft 1 for producing an image data by synthesizing radar wave reflection information (azimuth and distance) caught by the reception antenna $5_1$ and $5_2$ and output from the receivers $6_1$ and $6_2$.

This image synthesizer 10 is supplied with output signals of the receivers $6_1$ and $6_2$ via A/D converters $7_1$ and $7_2$. Each of the A/D converters $7_1$ and $7_2$ converts an input signal into a digital signal and transmits the digital signal to the image synthesizer 10 while maintaining the phase of the caught signal.

Figure 3:
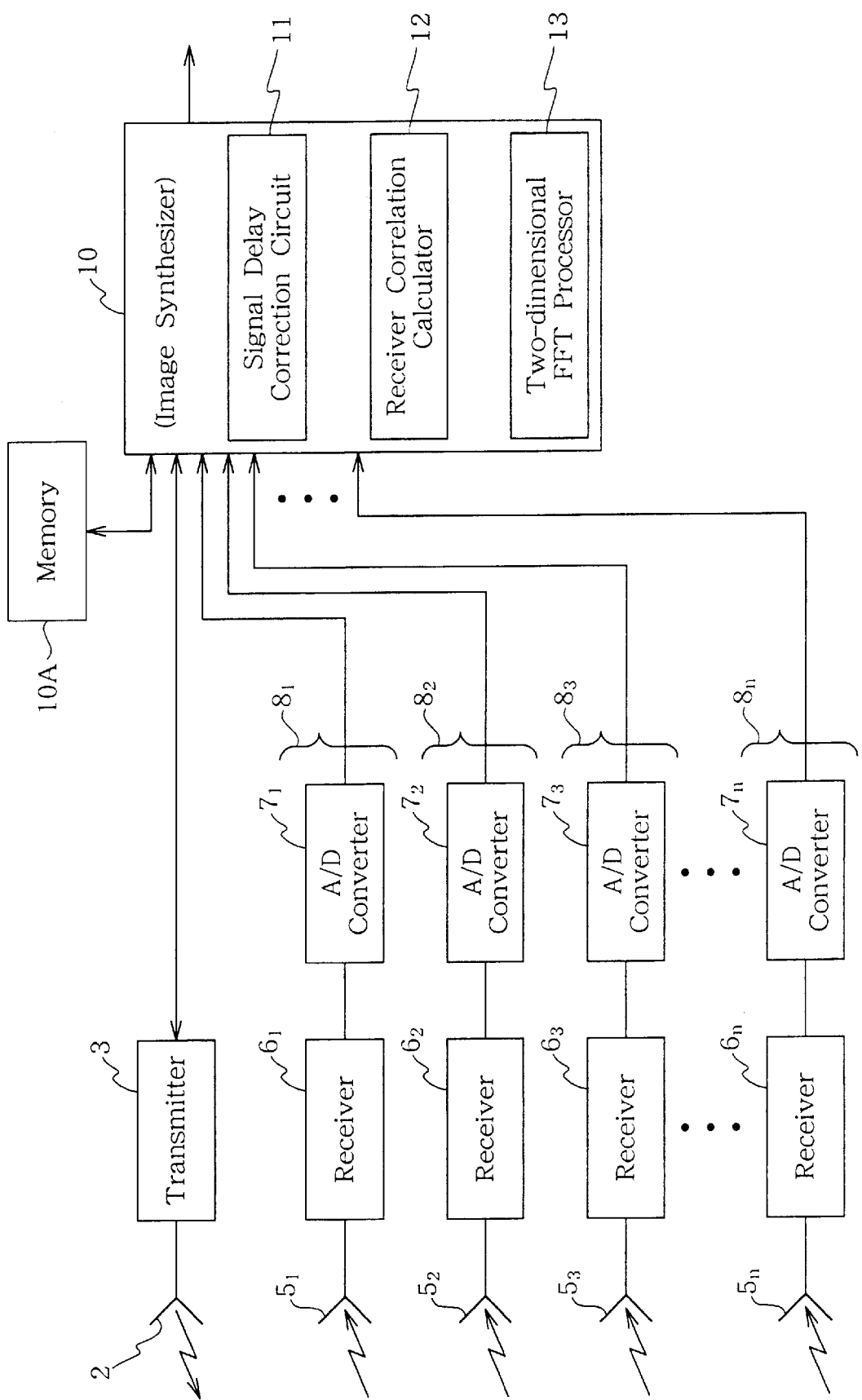
FIG. 3 shows a modified example of the first embodiment using more than two antenna sets.

FIG. 1 and FIG. 2 shows an example when two sets of reception systems $8_1$ and $8_2$ are constituted by the two reception antenna $5_1$ and $5_2$, the two receivers $6_1$ and $6_2$, and the two A/D converters $7_1$ and $7_2$. However, it is also possible as shown in FIG. 3 to mount three or more than three reception systems $8_1, 8_2, 8_3 \ldots 8_n$.

Moreover, the image synthesizing processor 10 of this embodiment includes: a signal delay correction function for correcting a signal transmission delay in the communication cable from the transmitter 2 through the receivers $6_1$, $6_2$ up to the image synthesizer 10 as well as a signal delay caused by the positions of the reception antennas; correlation calculation function for calculating a correlation of the reception signals received at the receivers $6_1$ and $6_2$; a two-dimensional fast Fourier transform (FFT) processor for performing an FFT processing according to the correction information obtained by the aforementioned functions and producing a two-dimensional image information of the distance direction and azimuth direction.

It should be noted that the correction of the two reception signals is performed by a signal delay correction circuit 11. The correlation between the reception signals in the receiver $6_1$ and $6_2$ is performed by a receiver correlation calculator 12. Furthermore, according to the correction information obtained by the aforementioned functions, the two-dimensional FFT processing is performed by a two-dimensional FFT processor 13, so as to create a two-dimensional image information of the distance direction and the azimuth direction.

Furthermore, corresponding to the receivers $6_1$, $6_2$, A/D converters $7_1$ and $7_2$ are provided, respectively. Each of the A/D converters $7_1$ and $7_2$ converts an input signal into a digital signal and transmits the digital signal into the aforementioned image synthesizer 10.

In this case, the image synthesizer 10 combines information items obtained by the left antenna $5_1$ and the right antenna $5_2$, each of which receives the reflection wave of the radar wave in the direction of the aircraft flying. According to these information items, a signal processing is performed to identify the reflection position.

The signal processing in the image synthesizer 10 is performed according to a procedure described below.

Firstly, in step 1, using one or more than one reflection radar wave caught by the reception antennas $5_1$ and $5_2$, a distance up to an reflection object is calculated for each of the reception antennas $5_1$ and $5_2$.

Next, in step 2, within the azimuth of a predetermined directivity (antenna beam) $5A_1$ and $5A_2$, an arc-shaped reflection object position curve ($R_{L0}$, $R_{L3}$, $R_{L4}$ in FIG. 7) is calculated for each of the reception antennas $5_1$ and $5_2$, centering at the respective reception antennas $5_1$ and $5_2$.

Moreover, in step 3, the reflection object position curves $R_{L0}$, $R_{L3}$, and $R_{L4}$ are converted into an image on common coordinates based on the directions and distances of the reception antennas $5_1$ and $5_2$.

Furthermore, in step 4, on the synthesized image specified by the aforementioned step 3, intersections between the $R_{L0}$, $R_{L3}$, $R_{L4}$ are specified as the actual positions of the reflection objects $K_3$ and $K_4$. The information on these positions are output together with the synthesized image information to a display apparatus or the like provided in a cockpit.

Description will now be directed to an operation of the aforementioned embodiment.

A radar wave (pulse wave) output from the aforementioned transmission antenna 2 is reflected by an object. The reception antenna $5_1$ or $5_2$ receives a composite information for objects at an identical distance.

Figure 9:
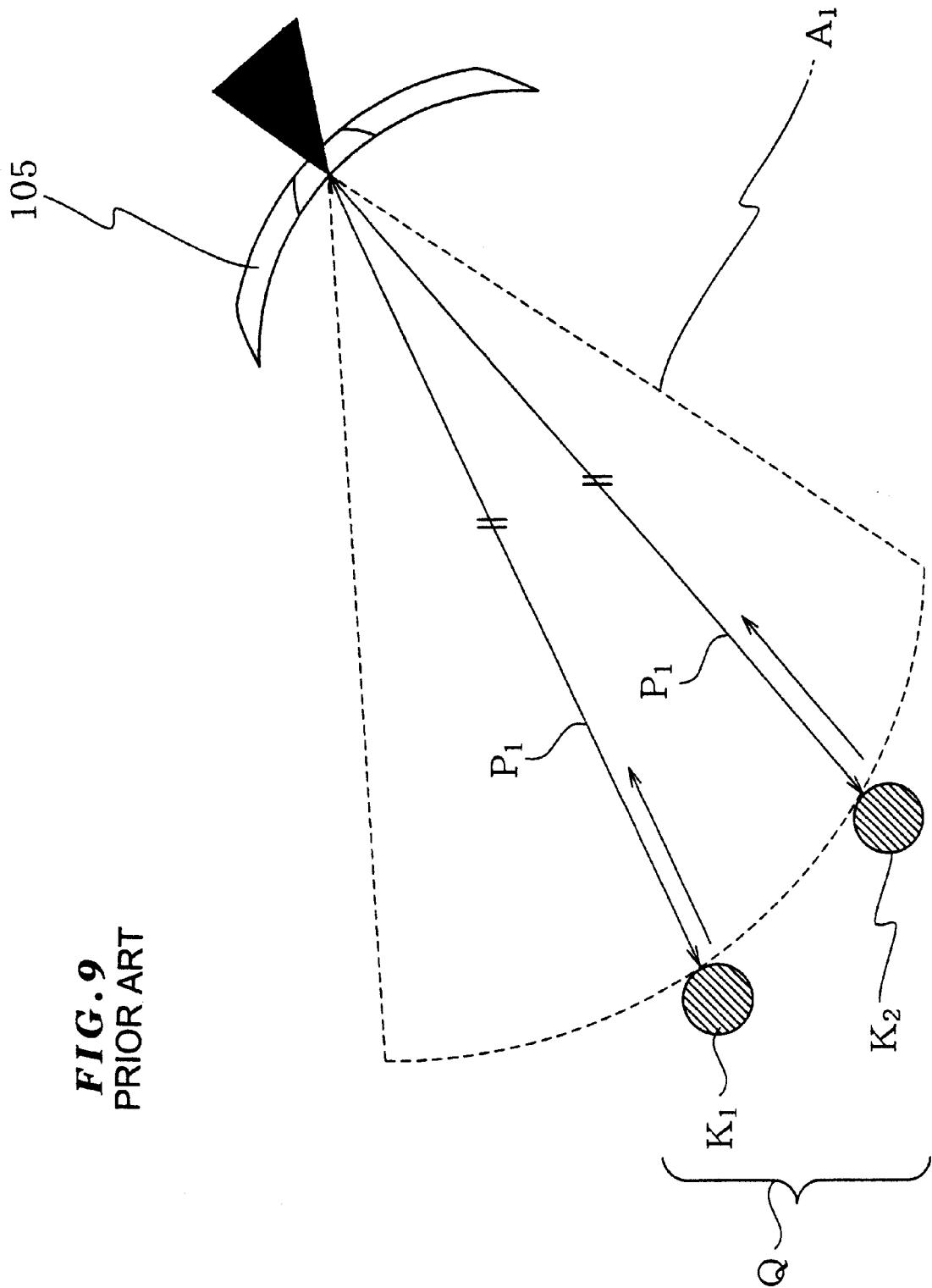
FIG. 9 shows an operation state of a conventional reception antenna.

This case is equivalent to the aforementioned conventional case of FIG. 9. That is, when only the single reception antenna $5_1$ is used, it is impossible to isolate an object $K_1$ from another object $K_2$. These two objects are caught as a composite one object.

In this case, as is conventionally known, the resolution is determined by the antenna beam width (actual aperture).

Figure 10:
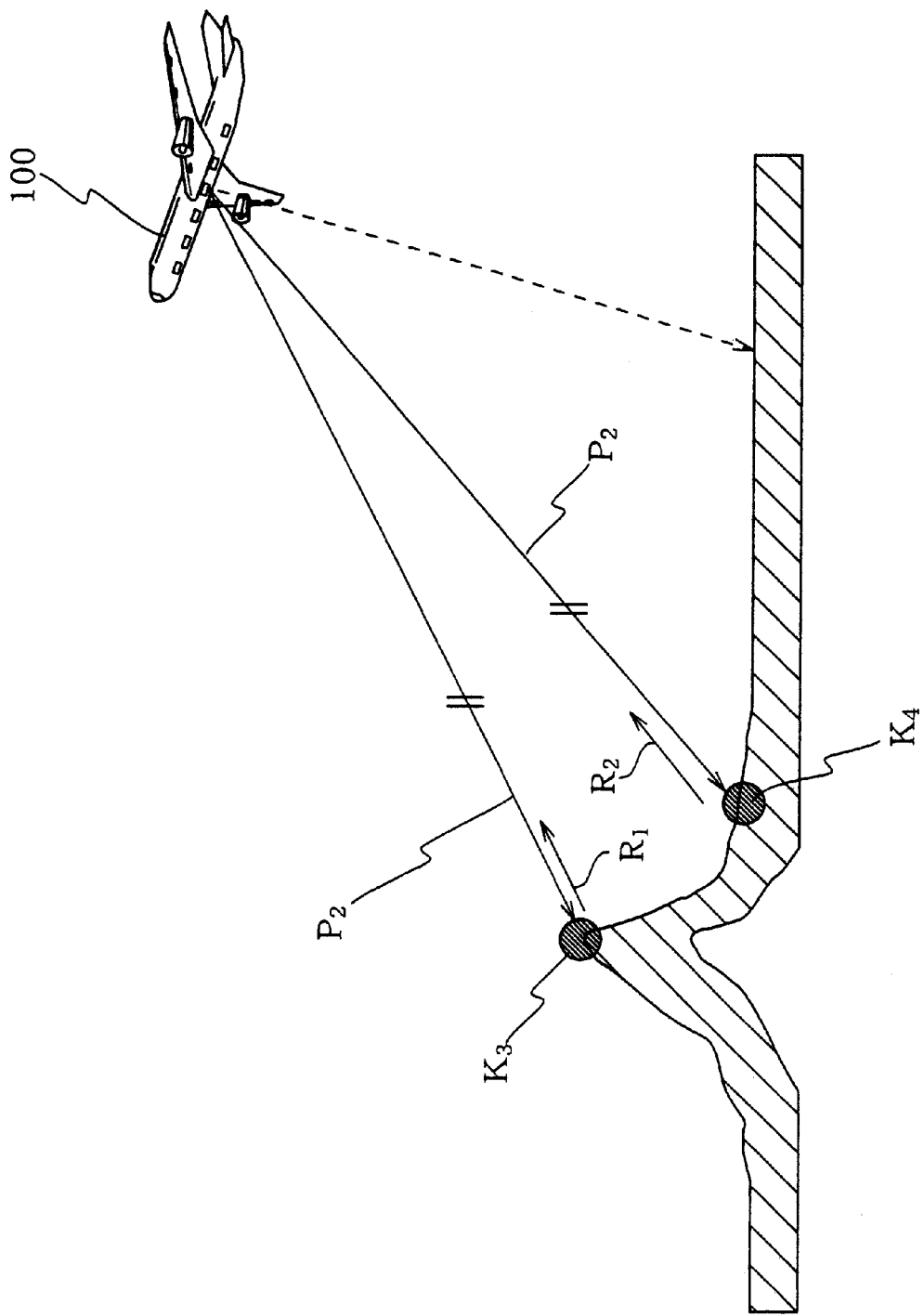
FIG. 10 shows an operation state of another conventional reception antenna.

Moreover, as has been explained in the conventional example of FIG. 10, when a single reception antenna such as the reception antenna $5_1$ is used, it is impossible to isolate the object $K_3$ from the object $K_4$ which are at different heights but at an identical distance.

Figure 4:
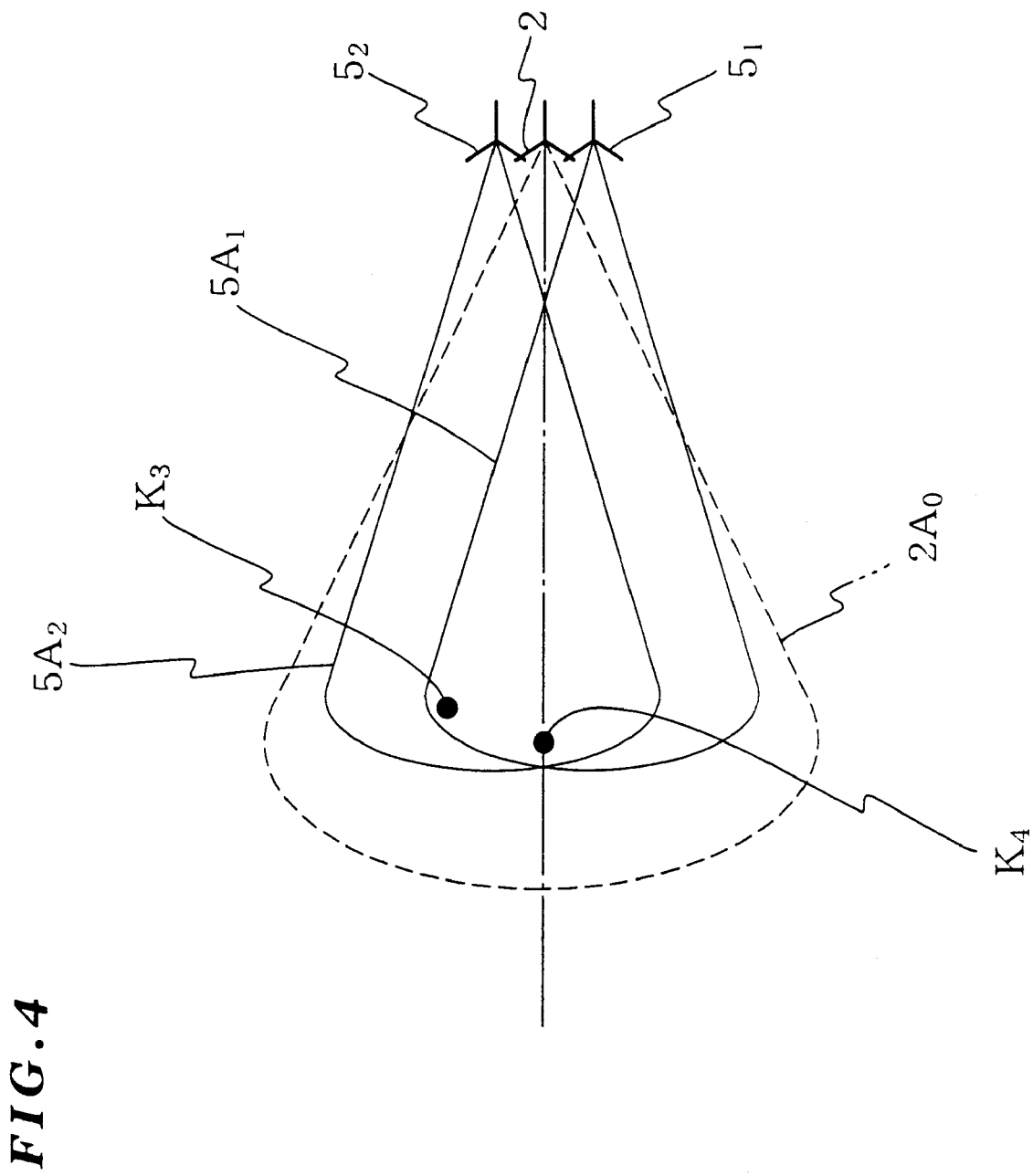
FIG. 4 shows an example of reception beams of two reception antennas in the first embodiment shown in FIG. 1.
Figure 5:
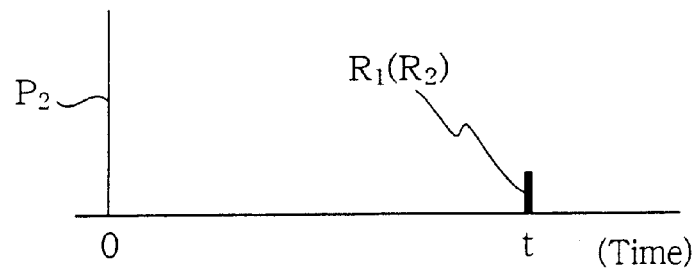
FIG. 5 shows an operation example of one (first) of the reception antennas in FIG. 4.
Figure 5:
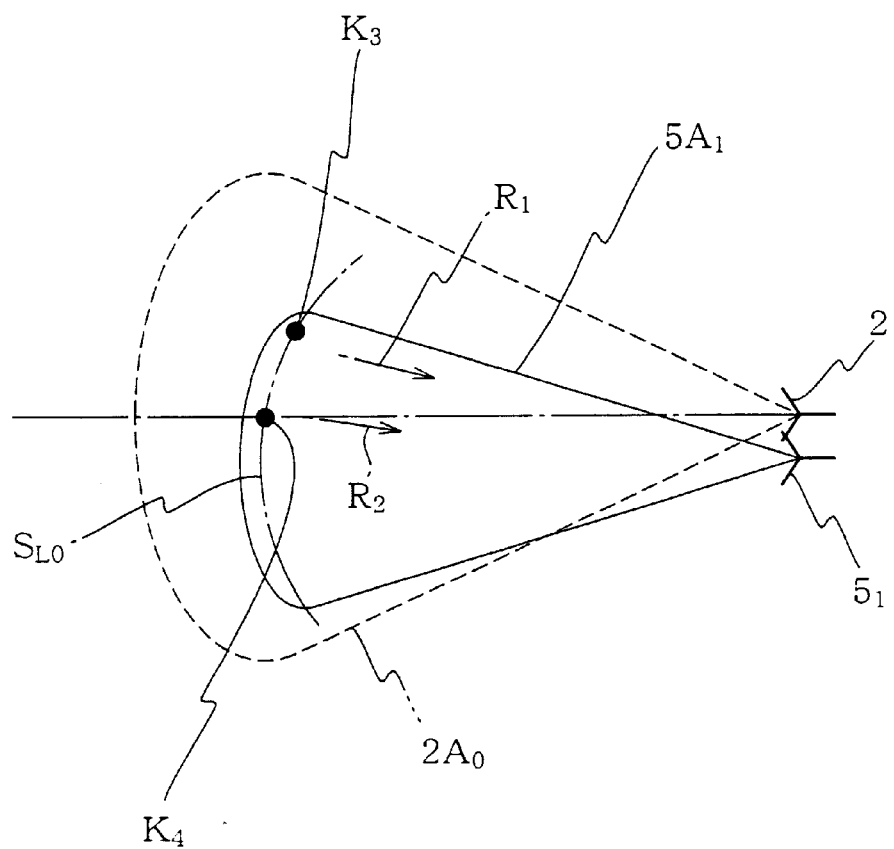
Figure 6:
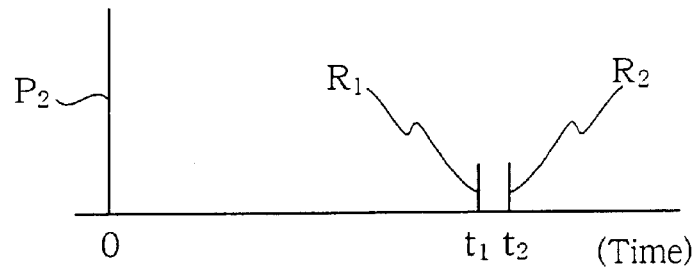
FIG. 6 shows an operation example of the other (second) reception antennas in FIG. 4.
Figure 6:
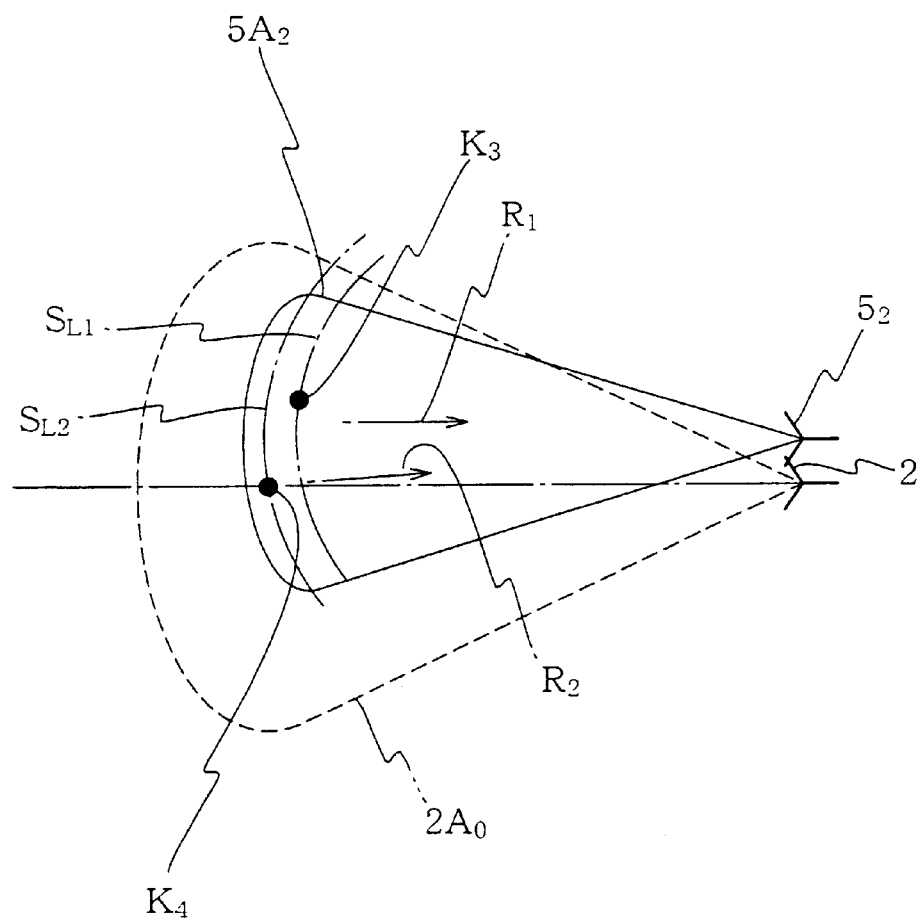

On the other hand, as shown in FIG. 4, when a plurality of reception antennas such as $5_1$ and $5_2$ are used, relative positions to an object is slightly different between the reception antennas $5_1$ and $5_2$. A change in the relative positions becomes a change in the reception signal pattern. Accordingly, by comparing the reception signals with each other, it is possible to identify a plurality of objects in the beam width.

This will be detailed below.

FIG. 5A is one-dimensional coordinates showing relationship between a transmission radar wave and reflection radar waves of a plurality of objects (targets) $K_3$ and $K_4$ caught by the reception antenna $5_1$. In the coordinates, symbol $P_2$ denotes a transmission radar wave, and $R_1$ and $R_2$ indicate the reflection radar wave. These $R_1$ and $R_2$ indicate positions of the plurality of objects $K_3$ and $K_4$.

In this case, as is clear from FIG. 5A, the objects $K_3$ and $K_4$ are at an identical distance from the reception antenna $5_1$ and cannot to be isolated from each other.

Moreover, FIG. 5B is a plan view showing reflection signals $R_1$ and $R_2$ in accordance with the directivity (antenna beam), i.e., beam width (actual aperture width). In the present embodiment, the beam width (actual aperture width) and the display data of the distance direction are stored in memory 10A beforehand.

In this FIG. 5B, the objects $K_3$ and $K_4$ are both on an arc section formed around the center of the reception antenna $5_1$, i.e., the objects $K_3$ and $K_4$ are at an identical distance from the reception antenna $5_1$.

That is, the positions on this arc section $R_{L0}$ are equivalent to the position of $R_1$ and $R_2$ of the reflection radar wave shown in FIG. 5A. When viewed from the reception antenna $5_1$ in FIG. 5A, the two objects $K_3$ and $K_4$ are both within the beam width (actual aperture width) and at an identical distance (on the arc section $R_{L0}$). Accordingly the objects $K_3$ and $K_4$ cannot be isolated from each other.

Moreover, the two-dimensional image information is also temporarily stored in the aforementioned memory 10A at a predetermined timing.

FIG. 6A is one-dimensional coordinates showing relationship between transmission radar wave and reflection radar waves of a plurality of objects (targets) $K_3$ and $K_4$ caught by the reception antenna $5_2$. In this case, the objects $K_3$ and $K_4$ are at different distances when viewed from the position of the reception antenna $5_2$ as will be detailed with reference to FIG. 6B.

Here, the symbol P2 indicates a transmission radar wave, and symbols $R_1$ and $R_2$ indicate reflection radar waves. The reflection signals $R_1$ and $R_2$ specify the positions of the two objects (targets) $K_3$ and $K_4$.

The two objects $K_3$ and $K_4$ are at different distances from the reception antenna $5_2$ and are isolated from each other as shown in FIG. 6A. That is, signals $R_1$ and $R_2$ Of the reflection radar waves from the two objects $K_3$ and $K_4$ and caught by the reception antenna $5_2$ indicate signal positions in the distance direction.

Moreover, FIG. 6B shows a case when the objects $K_3$ and $K_4$ are on arc sections $R_{L3}$ and $R_{L4}$, respectively, around the reception antenna $5_2$ as the center. That is, the objects $K_3$ and $K_4$ are at different distances from the reception antenna $5_2$.

That is, the positions of the arc sections $R_{L3}$ and $R_{L4}$ are equivalent to the reflection radar waves $R_1$ and $R_2$ in FIG. 6A. As shown in FIG. 6A, when viewed from the reception antenna $5_2$, the two objects $K_3$ and $K_4$ are within the beam width (actual aperture width) and at different distances. Accordingly, the objects $K_3$ and $K_4$ are easily isolated from each other.

Moreover, the two-dimensional image information in this case is also temporarily stored in the aforementioned memory at a predetermined timing.

Figure 7:
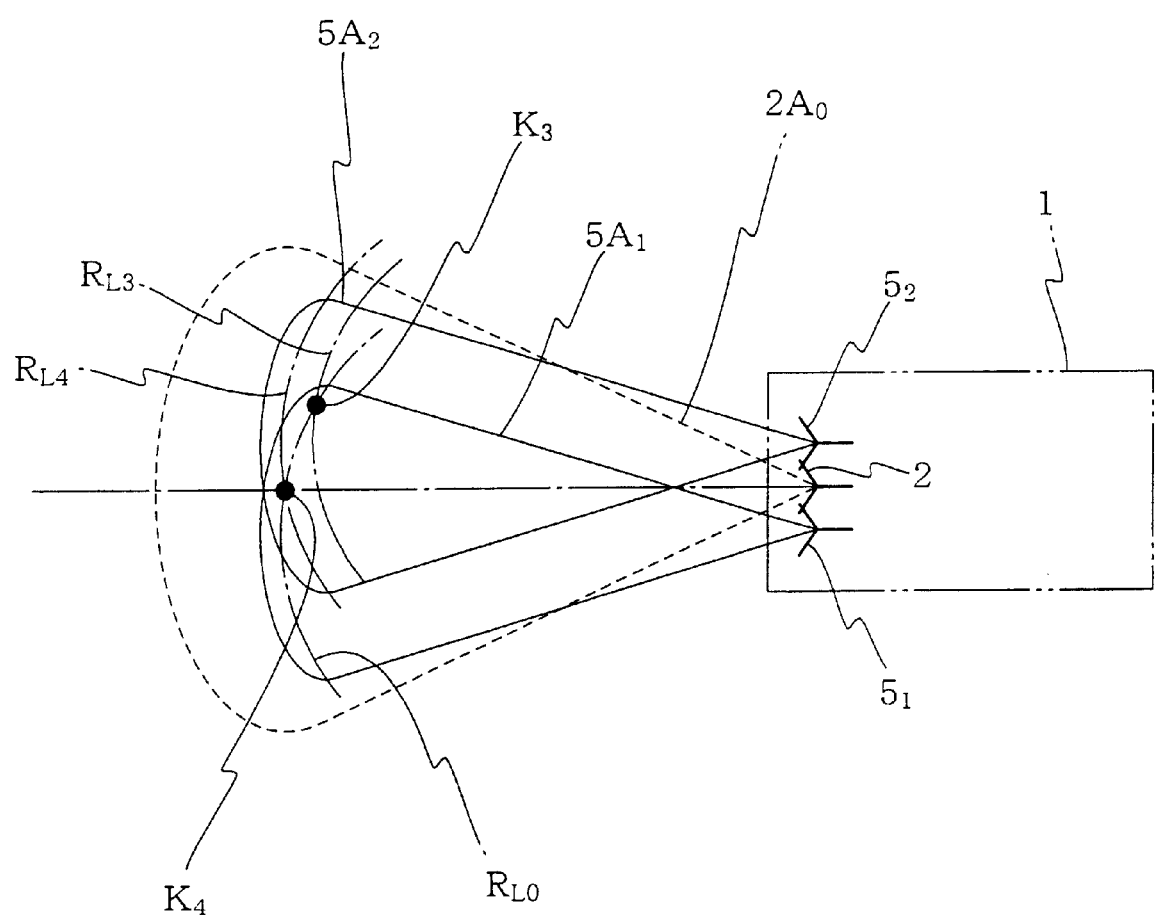
FIG. 7 shows an operation example of the first embodiment shown in FIG. 1, i.e., a result of phase combining of FIG. 5B with FIG. 6B.

The two-dimensional information items obtained by the reception antennas $5_1$ and $5_2$ and analyzed in FIG. 5B and FIG. 6B are fetched from the memory 10A and overlaid as shown in FIG. 7.

In this FIG. 7, arc section $R_{L0}$ shows position information of the objects $K_3$ and $K_4$ obtained from the reception antenna $5_1$. Moreover, the arc sections $R_{L3}$ and $R_{L4}$ shows position information of the objects $K_3$ and $K_4$ obtained from the other reception antenna $5_2$.

These three arc section $R_{L0}$, $R_{L3}$, and $AR_{L4}$ intersects one another because the two reception antennas are provided at a predetermined distance. The intersection points indicate geometric position of the objects $K_3$ and $K_4$.

The position information of the objects $K_3$ and $K_4$ are calculated by the image synthesizer 10 according to various information items such as the positional relationship between the transmission antenna 2 and the reception antennas $5_1$, $5_2$; the beam width (actual aperture width) of the reception antennas $5_1$ and $5_2$; and distance direction information caught by each of the reception antennas $5_1$ and $5_2$.

The calculation result is temporarily stored in the memory 10A and subjected to a predetermined signal processing before output through a radar image display apparatus mounted in the cockpit.

The azimuth position information of the $K_3$ and $K_4$ calculated as explained above has an almost identical azimuth position accuracy obtained theoretically, for example, by an acute radar wave with directivity almost 0 emitted in the direction of a nose of an aircraft, centering, for example, on the center of the transmission antenna 2.

Actually, there are various physical conditions disabling to obtain the directivity near 0, but it is possible to obtain the same effect as when scanning with an antenna having an extremely small beam width. Thus, it is possible to assure an azimuth resolution higher than the actual aperture width.

That is, by using the radar according to the present embodiment, it is possible to obtain a high resolution such as 1 meter with a high frequency of 1 Hz or more, for the forward direction of an aircraft, which has been difficult for the conventional apparatus Thus, according to the present embodiment, a plurality of reception antennas are arranged in the advance direction of an aircraft and in the direction vertical to that advance direction. This enables to simultaneously obtain an information on the roughness in the distance direction (mountain and plane) and an information on the planer spread in the azimuth direction. Thus, by displaying the azimuth direction in the horizontal axis and the distance direction in the vertical axis, it is possible to observe a two-dimensional image of the front of the aircraft.

Moreover, comparison of the reception signals and identification of an on-earth point can be calculated with a high frequency using the two-dimensional Fast Fourier Transform (FFT) on the correlation information between the reception antennas.

Thus, by using the radar according to the present embodiment, it is possible to obtain a high resolution such as 1 meter with a high frequency of 1 Hz or more, for the forward direction of an aircraft, which has been difficult for the conventional apparatus This enables to obtain information as an image on a display necessary for avoiding a navigation mistake which often occurs during a bad weather or misjudgment at landing which leads to collision onto a mountain. Thus, load on pilots is reduced and the equipment for this can be of a small size.

In the aforementioned embodiment, a transmission antenna is mounted on the nose of the aircraft, but the transmission antenna may be placed other than at the nose.

Moreover, the plurality of reception antennas may be arranged on the body instead of wings.

Figure 8:
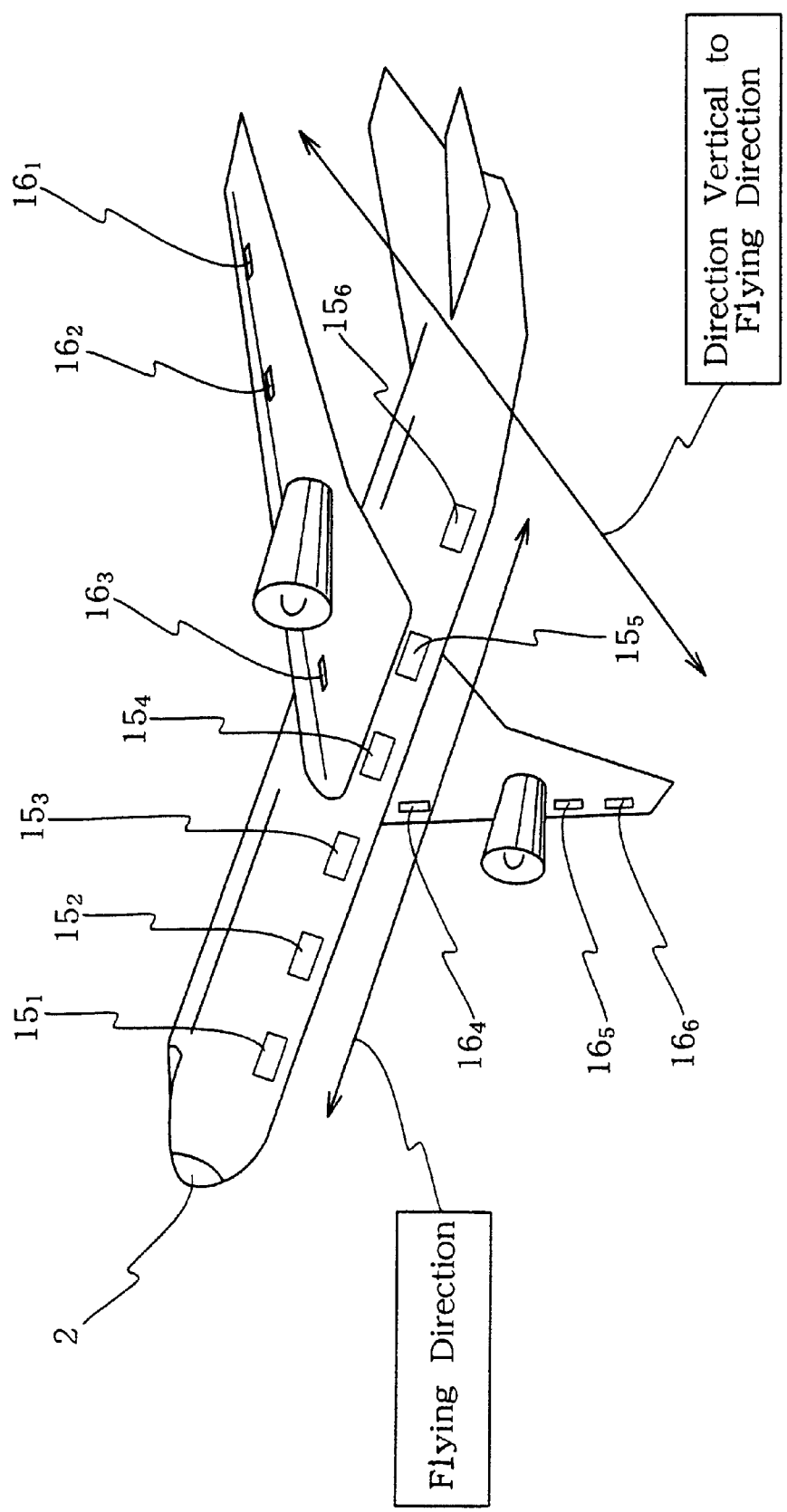
FIG. 8 shows another (second) embodiment of the present invention.

Description will now be directed to another (second) embodiment of the present invention with reference to FIG. 8.

In this embodiment, a total of 12 reception antennas are mounted on the lower surface of the body of the aircraft and the on the lower surface of the wings.

In this case, on the lower surface of the body, there are arranged six antennas $15_1$, $15_2$, $15_3$, $15_4$, $15_5$, and $15_6$ at an identical interval. Moreover, three reception antennas $16_1$, $16_2$, and $16_3$ are arranged on the left wing and three reception antennas $16_4$, $16_5$, and $16_6$ are arranged on the right wing at an identical interval.

Signals received by the reception antennas $15_1$ to $15_6$ are phase-synthesized for screen display, enabling to obtain a higher isolation degree. Similarly signals received by the antennas $16_1$ to $16_6$ are phase-synthesized for screen display, enabling to obtain a higher isolation degree in the direction vertical to the aircraft flying direction.

Here, the number of the reception antennas on the body and the number of the reception antennas on the wings are not to be limited a particular number. The arrangement of the total number of reception antennas may be modified according to various conditions.

Moreover, t he reception antennas may be made together with the aircraft structure or may be hung via pods. Furthermore, the radar transmission block may also be used for a radar of other objects (meteorological radar, fire control radar).

As has been described above, according to the present invention, by employing a plurality of conventional reception antennas, it is possible to obtain a predetermined phase-synthesized image, enabling to significantly improve the isolation degree (resolution) of an object caught by a radar wave. The arrangement of a plurality of antennas enables to obtain a high resolution in the flying direction of an aircraft as well as in the direction vertical the flying direction. Furthermore, the present invention can improve resolution without requiring a large-size antenna having a large aperture. Accordingly, in comparison to a conventional antenna of a large aperture, it is possible to reduce the entire size and increase the reliability because a plurality of antennas are used for catching an object.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-218102 (Filed on Jul. $31^{ST}$, 1998) including specification, claims, drawings and summary are incorporated herein by reference in its entirety.

What is claimed is:

1. An image synthesis method using a plurality of radar waves from at least two reception antennas mounted at a predetermined distance from each other for receiving reflection waves of a radar wave emitted forward from an aircraft, wherein information items obtained from these plurality of antennas are image-synthesized so as to identify a position of a reflection object, the method comprising following four steps:

in a first step, a distance from each of the reception antennas to an object or objects are calculated using one or more than one reflection waves caught by the reception antennas;

in a second step, within an antenna beam azimuth, a reflection object position arc-shaped curve is calculated for each of the reception antennas as the center of the arc curve;

in a third step, the reflection object position curves obtained within the antenna beam from the second step and the first step are plotted on common coordinates based on the reception antenna directions and a distance between the reception antennas;

in a fourth step, actual position of the reflection object (or reflection objects) is (are) identified as intersecting points of the reflection object position curves on the synthesized image obtained by step 3.

2. An image radar apparatus to be mounted on an aircraft, the image radar apparatus comprising: a transmission antenna and a transmitter for producing a predetermined search electric wave; and a plurality of sets of a reception antenna and a receiver for receiving reflection waves of the search electric wave output from the transmission antenna, wherein the plurality of reception antennas are arranged on the aircraft at an identical interval, and the reflection information items caught by this plurality of reception antennas are image-synthesized by an image synthesizer, result of which is output as a two-dimensional synthesized image data including position information of the reflection objects.

3. An image radar apparatus to be mounted on an aircraft as claimed in claim 2, wherein the transmission antenna is mounted on the body of the aircraft and the plurality of reception antennas are mounted at respective positions at a predetermined interval on the wing of the aircraft.

4. An image radar apparatus to be mounted on an aircraft as claimed in claim 2, wherein the transmission antenna is mounted at a nose of the aircraft and the reception antennas are mounted at predetermined positions at a predetermined interval.

5. An image radar apparatus to be mounted on an aircraft as claimed in claim 2, wherein the transmission antenna is mounted on the nose of the aircraft and the reception antennas are mounted on the right and left wings at a predetermined interval.

6. An image radar apparatus to be mounted on an aircraft, the apparatus comprising:
- a radar transmission antenna and a transmitter for producing a predetermined search electric wave in a flying direction of the aircraft;
- a plurality of sets of a reception antenna and a receiver for receiving a reflection wave of the search electric wave output from the transmission antenna; and
- an image synthesizer;
- wherein the reception antennas are mounted on the aircraft at a predetermined interval and reflection information caught by these reception antennas is supplied to the image synthesizer so as to be subjected image synthesis to be output as a two-dimensional synthesized image data containing a position information of a reflection object,
- the image synthesizer having a signal delay correction function for correcting a signal delay caused by the positional difference between the reception antennas including a signal delay in a communication cable.

7. An image radar apparatus to be mounted on an aircraft as claimed in claim 6, wherein the transmission antenna is mounted on the body of the aircraft and the plurality of reception antennas are mounted at respective positions at a predetermined interval on the wing of the aircraft.

8. An image radar apparatus to be mounted on an aircraft as claimed in claim 6, wherein the transmission antenna is mounted at a nose of the aircraft and the reception antennas are mounted at predetermined positions at a predetermined interval.

9. An image radar apparatus to be mounted on an aircraft as claimed in claim 6, wherein the transmission antenna is mounted on the nose of the aircraft and the reception antennas are mounted on the right and left wings at a predetermined interval.

10. An image radar apparatus to be mounted on an aircraft, the apparatus comprising:
- a radar transmission antenna and a transmitter for producing a predetermined search electric wave in a flying direction of the aircraft;
- a plurality of sets of a reception antenna and a receiver for receiving a reflection wave of the search electric wave output from the transmission antenna; and
- an image synthesizer;
- wherein the reception antennas are mounted on the aircraft at a predetermined interval and reflection information caught by these reception antennas is supplied to the image synthesizer so as to be subjected image synthesis to be output as a two-dimensional synthesized image data containing a position information of a reflection object,
- the image synthesizer having a two-dimensional Fast Fourier Transform (FFT) processing function for performing the FFT according to the reflection information caught by the plurality of reception antennas so as to create and output a two-dimensional synthesized image data containing information both for the distance direction and the azimuth direction.

11. An image radar apparatus to be mounted on an aircraft as claimed in claim 10, wherein the transmission antenna is mounted on the body of the aircraft and the plurality of reception antennas are mounted at respective positions at a predetermined interval on the wing of the aircraft.

12. An image radar apparatus to be mounted on an aircraft as claimed in claim 4, wherein the transmission antenna is mounted at a nose of the aircraft and the reception antennas are mounted at predetermined positions at a predetermined interval.

13. An image radar apparatus to be mounted on an aircraft as claimed in claim 10, wherein the transmission antenna is mounted on the nose of the aircraft and the reception antennas are mounted on the right and left wings at a predetermined interval.

14. An image radar apparatus to be mounted on an aircraft, the apparatus comprising:
- a radar transmission antenna and a transmitter for producing a predetermined search electric wave in a flying direction of the aircraft;
- a plurality of sets of a reception antenna and a receiver for receiving a reflection wave of the search electric wave output from the transmission antenna; and
- an image synthesizer;
- wherein the reception antennas are mounted on the aircraft at a predetermined interval and reflection information caught by these reception antennas is supplied to the image synthesizer so as to be subjected image synthesis to be output as a two-dimensional synthesized image data containing a position information of a reflection object,
- the image synthesizer having: a signal delay correction function for correcting a signal delay due to positional difference between the reception antennas including the delay in a communication cable; a correlation calculation function for calculating a correlation between received signals; and a two-dimensional Fast Fourier Transform (FFT) processing function for performing the FFT according to the correction information obtained by the aforementioned functions, so as to create and output a two-dimensional synthesized image data containing information both for the distance direction and the azimuth direction.

15. An image radar apparatus to be mounted on an aircraft as claimed in claim 14, wherein the transmission antenna is mounted on the body of the aircraft and the plurality of reception antennas are mounted at respective positions at a predetermined interval on the wing of the aircraft.

16. An image radar apparatus to be mounted on an aircraft as claimed in claim 14, wherein the transmission antenna is mounted at a nose of the aircraft and the reception antennas are mounted at predetermined positions at a predetermined interval.

17. An image radar apparatus to be mounted on an aircraft as claimed in claim 14, wherein the transmission antenna is mounted on the nose of the aircraft and the reception antennas are mounted on the right and left wings at a predetermined interval.

* * * * *